United States Patent Office

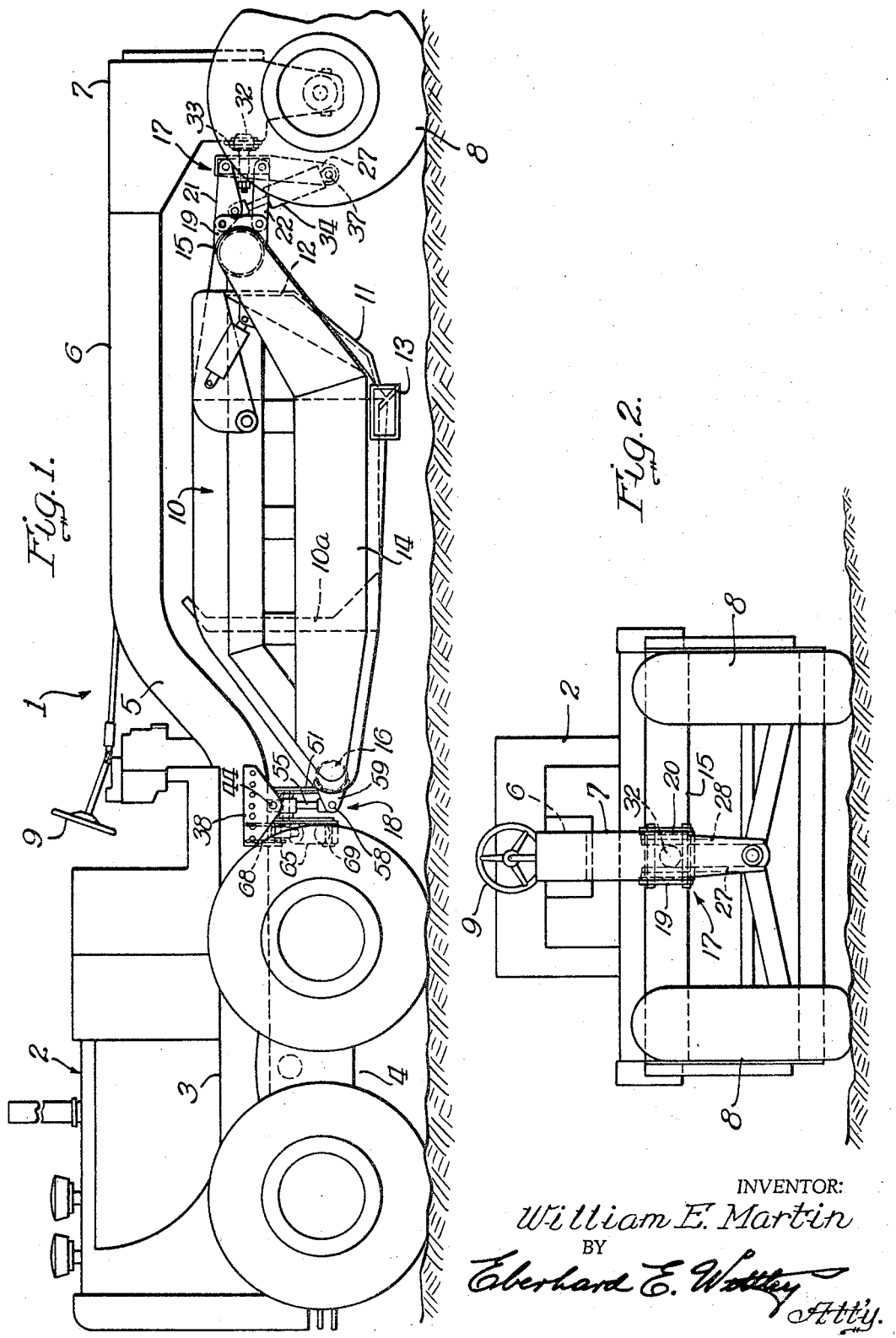

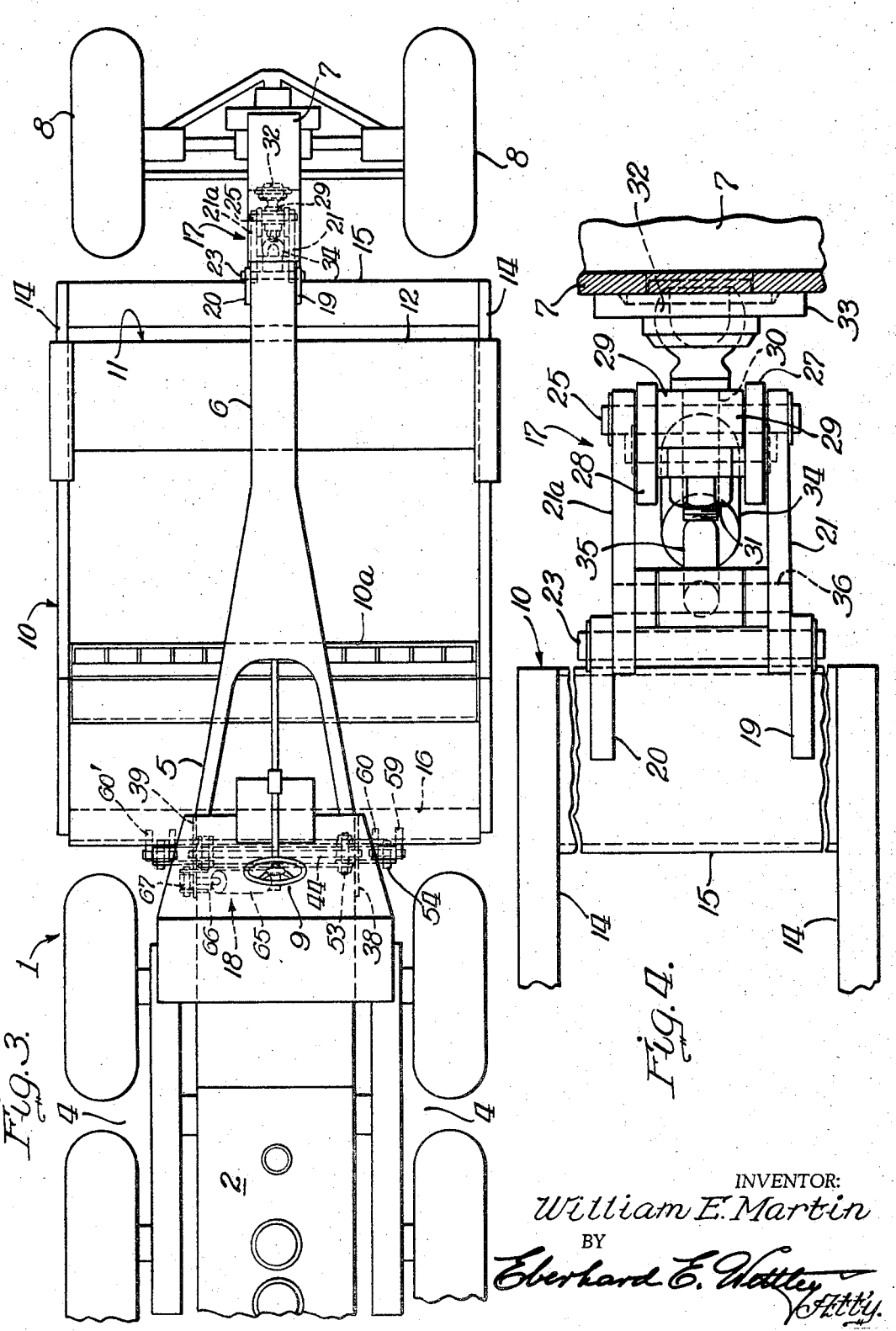

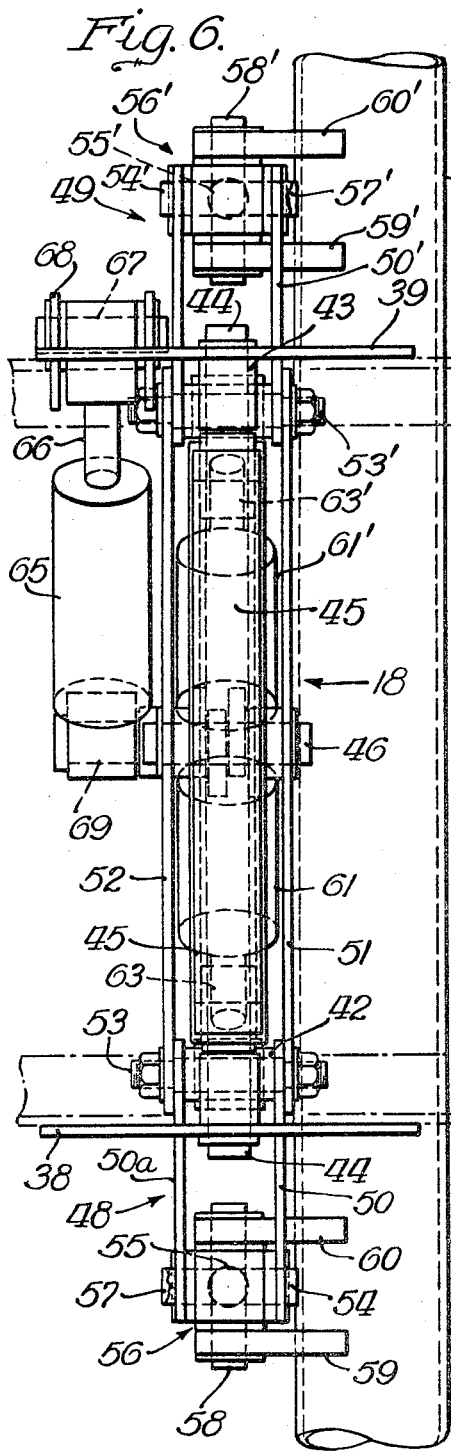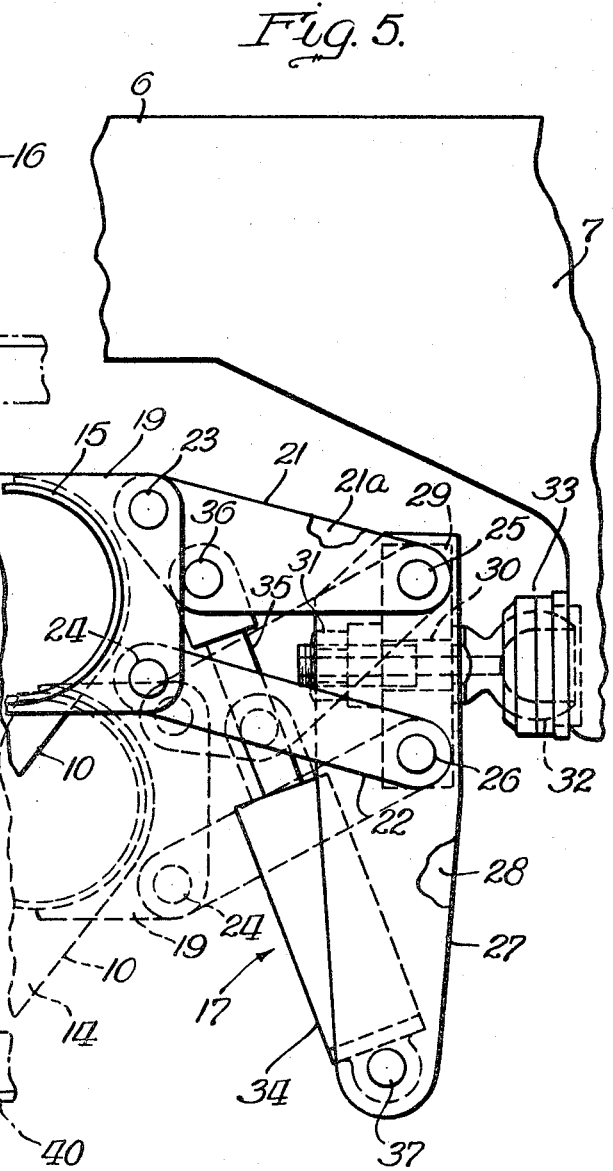

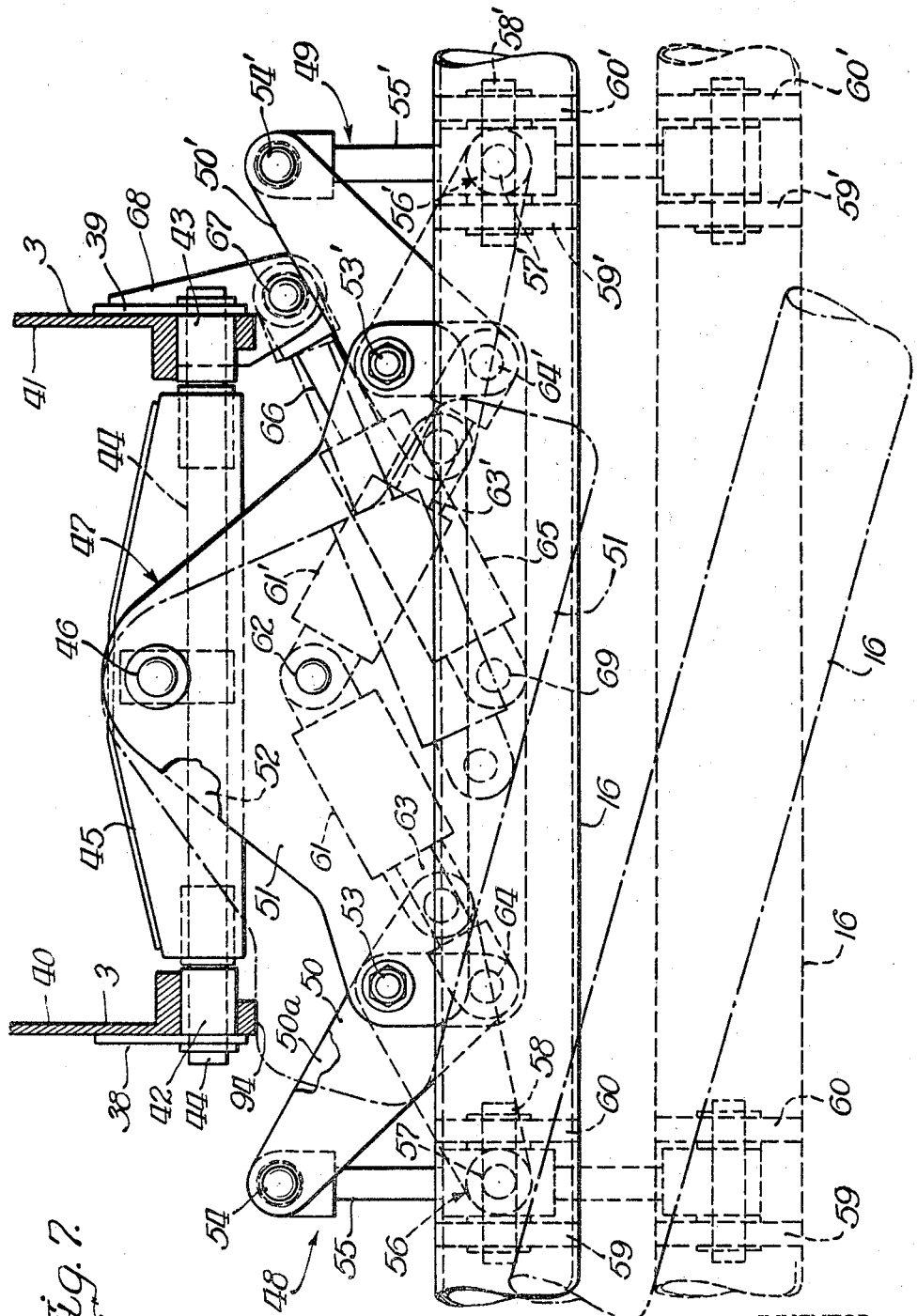

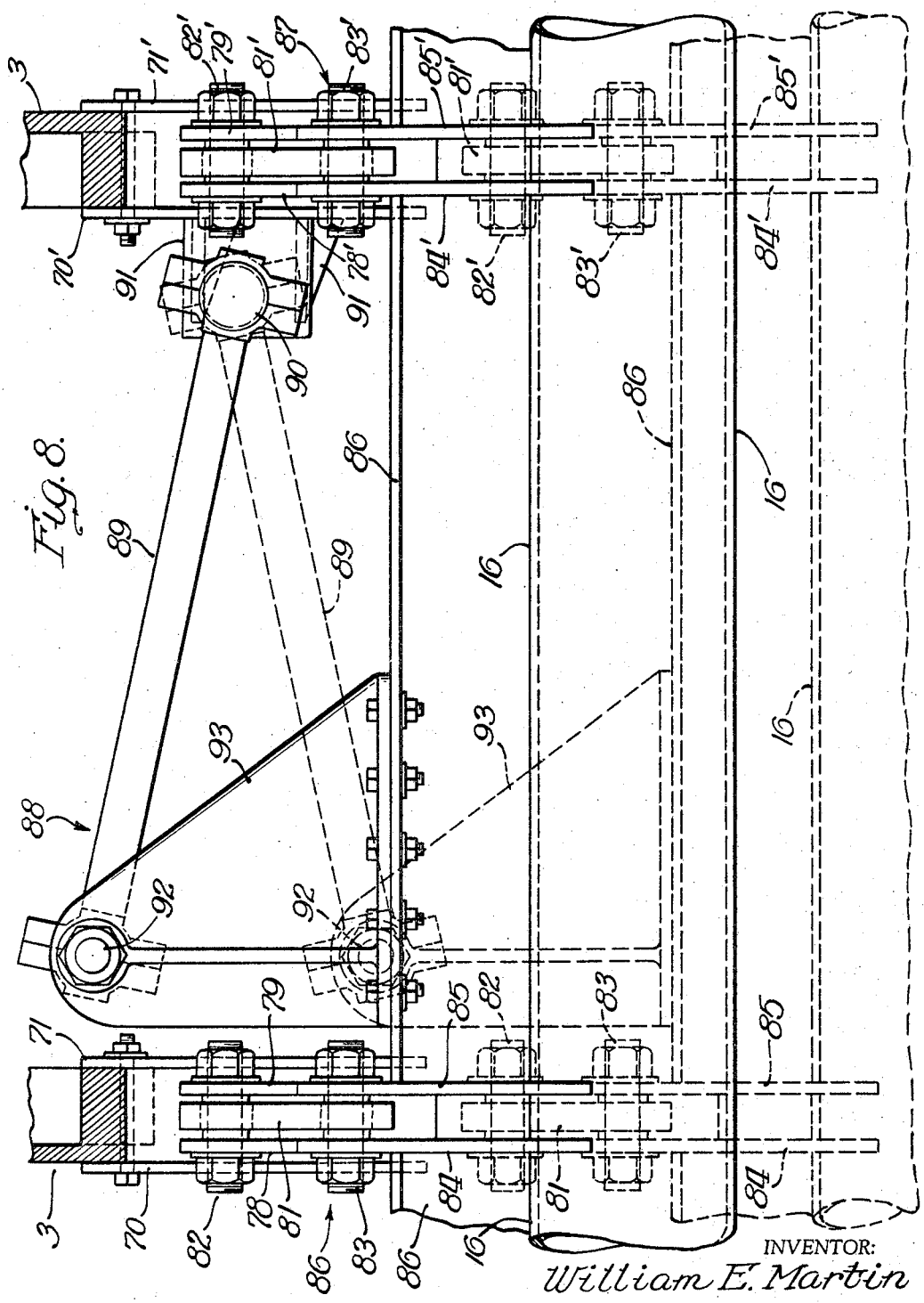

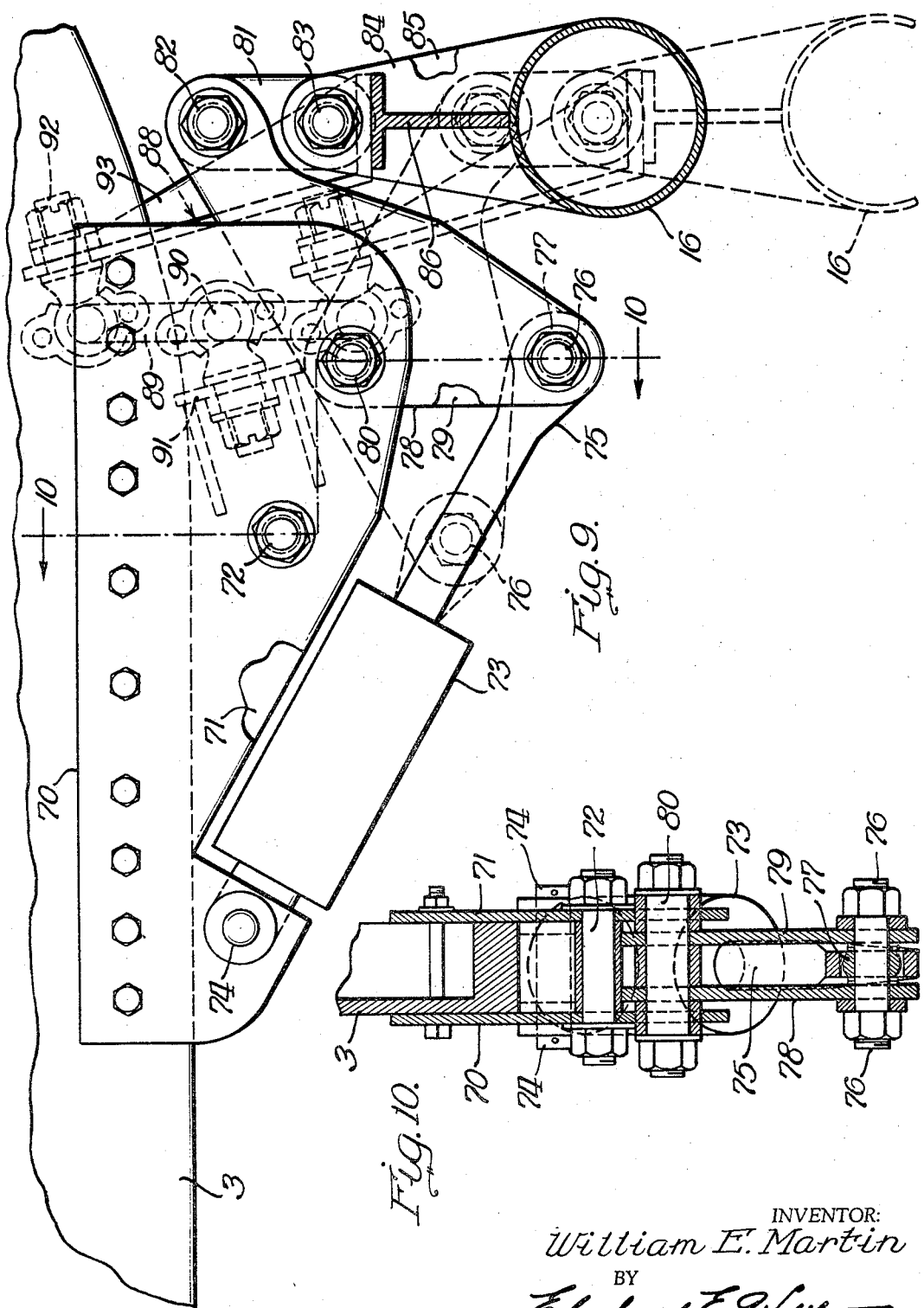

3,435,547
Patented Apr. 1, 1969

3,435,547
SELF-CONTAINED SCRAPER BOWL ASSEMBLY
ADAPTED FOR ATTACHMENT WITH MOBILE
VEHICLE
William E. Martin, % The Martin Company, P.O.
Box 187, Kewanee, Ill. 61443
Filed Dec. 15, 1966, Ser. No. 602,107
Int. Cl. E02f 3/62
U.S. Cl. 37—124  10 Claims

ABSTRACT OF THE DISCLOSURE

A scraper bowl assembly and vehicle therefor comprises a scraper bowl positioned beneath an elongate intermediate vehicle frame portion and mounted on front and rear portions of the vehicle frame so as not to stress the intermediate frame portion. The scraper bowl assembly includes mounting elements secured to front and rear bowl parts with means to elevate the bowl relative to the mounting elements wherein the elevating means is operative between the mounting elements and the bowl.

---

This invention is directed to a grader scraper providing an entirely self-contained assembly as a piece of accessory equipment including its own operating mechanisms which are all readily attachable to a standard road working vehicle such as a motor grader to provide a substitute working unit in place of the usual blade and blade support structure when the latter are removed from the grader.

More specifically, this invention relates to a scraper of the type that provides a material carrying bowl having an apron controlled open front end and an ejector mechanism within the bowl for material discharge control to work with the apron, the scraper bowl of this design being positionable beneath the motor grader frame for attachable support in fore and aft locations over or adjacent the wheel assemblies of the motor grader and a scraper bowl that is devised to include regulatory mechanisms to raise or lower the front or back portions of the bowl as functionally needed and to induce controlled bowl tilt laterally in either direction of inclination to the surface of the ground.

One of the objects of this material hauling and material distribution scraper is the provision of a new suspension system for the scraper bowl that will permit independent raising and lowering of the forward cutting blade and loading end of the bowl and of the rear end of such bowl, both fore and aft ends of the bowl being thus individually suspended and subject to selected vertical adjustment relative to the ground and to the vehicle from which the bowl is supported and connected for mobile operation.

Added to the above object, this invention includes operable means carried by the suspension means and connected with the bowl structure to cause controlled bowl tilt in the lateral direction considered in relation to the median line of travel of the bowl supporting vehicle, the tilt being introduced to angle the bowl to the ground or road to either side of the vehicle.

Another object is to provide an entirely self-contained and self-operable assembly as an earth moving scraper arrangement having a material carrying bowl equipped with support mechanisms and hydraulic power means that suspend the assembly from a structural unit or units of a mobile power road working machine. While hydraulic power may be supplied through independent hydraulic supply mechanisms and lines to the power means for the scraper bowl, the hydraulic power in the present invention is not specifically shown, but it is to be understood that suitable hydraulic lines are connected with the hydraulic system of the motor grader or other vehicle carrying the scraper bowl to be used to operate the power cylinders of the bowl power means and controlled by appropriate valving means.

A further object is to provide scraper bowl suspension apparatii in fore and aft locations on the scraper bowl to locate the attachment elements in positions and locations to connect with frame portions or sections of the mobile carrying machine or vehicle that are located over or adjacent the wheeled units of such machine and vehicle. By using this suspension arrangement, the long overhead frame of a motor grader or other earth working vehicle is not being subjected to the loads and working stresses of the scraper bowl to thus provide an improved working relationship over constructions such as shown in Elenburg Patent No. 3,052,049, issued Sept. 4, 1962 and assigned to the inventor in this application. In the patent the bowl is suspended from intermediate the overhead vehicle frame and vertically operated from the crank units of the motor grader from this mid-frame location.

It should be noted that the present design of self-contained bowl assembly and self-operable associated apparatus hereinbefore mentioned is a further improvement over the type and construction of scraper bowl and suspension means shown and described in the Elenburg Patent No. 3,052,049 and over other similar vehicle and bowl arrangements.

Another object is to provide a scraper bowl assembly having an adjustable universal forward draft support means and having hydraulic cylinder control lifting mechanisms at the trailing end of the bowl mounted on a rockable supporting means connected with the bowl carrying vehicle and including further cylinder means to cause tilting of the rockable supporting means to tilt the bowl laterally relatively to the surface being worked and in inclinations to either side of the vehicle.

A further object is to provide laterally spaced bowl supporting cylinder means at the rear of the bowl and to each side of the frame of the bowl supporting vehicle to bodily raise or lower the bowl at that point in horizontal relation to the surface being worked or to dispose the bowl into a given tilted position in relation to the ground by raising either side of the bowl with one cylinder means and lowering the opposite bowl side with the other bowl means, this same construction also including a stabilizing bar arrangement to keep the rear portion of the bowl assembly generally centered under the motor grader or bowl carrying vehicle frame during operation.

A still further object is to supplement the rear bowl suspension and control means with a front end height regulating means or lifting mechanism having a universal connection with the vehicle frame over the front wheels and including a hydraulic cylinder arrangement for the height adjustment of the forward bowl end.

And another object is to establish rear bowl support structures that include simple bracket attachment means for releasable connection with the frame of a mobile vehicle to operatively suspend the rear bowl end from the frame and through the operable adjustable means devised to regulate the bowl position at this point of connection relatively to the vehicle frame.

All other objects and advantages relating to the present self-contained scraper assembly means shall hereinafter appear in or become evident from the following detailed description having reference to the accompanying drawings forming a part of this specification.

In the drawings:

FIG. 1 is a side elevational view of a mobile vehicle comprising a motor grader which is equipped with the self-contained scraper bowl assembly which has in this case been substituted for the usual earth scraper blade and blade support mechanism normally carried by this vehicle;

FIG. 2 is a diagrammatic front elevational view of the earth working machine shown in FIG. 1;

FIG. 3 is a plan view of the FIG. 1 machine;

FIG. 4 is an enlarged detail plan view of the forward scraper bowl suspension means shown in FIGS. 1 and 3;

FIG. 5 is a side elevational view of the forward scraper bowl suspension means of FIG. 4;

FIG. 6 is an enlarged detailed plan view of the rear bowl end suspension means and bowl control apparatus shown in FIGS. 1 and 3;

FIG. 7 is a side elevational view of the FIG. 6 arrangement with portions thereof shown in section;

FIG. 8 is another transverse elevational view similar to the FIG. 7 illustration, but showing a modified bowl suspension and bowl level control apparatus;

FIG. 9 is a side elevational view of the modified construction in FIG. 8 as the same would appear when viewed looking at the side of the frame of the mobile supporting or bowl carrying vehicle; and FIG. 10 is a vertical cross sectional view substantially as taken along the the line 10—10 in FIG. 9 to show structural details of this modified construction.

Referring to the earth working machine shown in FIGS. 1, 2 and 3, this assembly comprises a motor grader 1 of a conventional construction having an engine 2 on the rear chassis frame 3 supported over the articulate power driven wheel carriage 4 all at the rear end of the grader 1 and wherein the intermediate frame angles upwardly at 5 to extend in an elevated position 6 toward the forward dependent frame 7 that connects with the front wheels 8 that are steerable by wheel 9 in a usual conventional manner.

The earth working scraper of the present invention is shown as attached for operation to the motor grader 1 and comprises a complete self-contained assembly in the form of a material carrying scraper bowl 10 with an open front end 11 controlled by an opening and closing apron 12 and edged at the bottom with a material cutting blade 13, the bowl 10 having suitable side frames 14 terminating in a forward elevated frame element providing a transverse cross tube 15 and in a rearward transverse cross tube 16 adjacent the lower or bottom level of the bowl 10. The bowl 10 also includes an ejector blade 10a therein which may be moved with any suitable operable apparatus here not shown for the sake of clarity. While various forms of ejector actuating mechanisms may be employed as in the Elenburg patent above referred to, it is possible to employ any of the forms of ejector blade actuation means such as shown by way of example in my copending application filed Oct. 13, 1965, Ser. No. 495,559.

Fore and aft suspension means 17 and 18 are connected with tubes 15 and 16 to provide the bowl supporting and position controlling means respectively for regulating the fore and aft bowl elevations with respect to the surface being worked and to cause lateral bowl inclinations as needed and as will be described.

Attention is directed to the suspension means 17 and 18, the mechanism 17 being connected with the frame structure 7 generally over the front wheels 8 and the mechanism 18 including attachment structure to connect with the chassis frame structure 3 closely adjacent the motor grader wheel carriage 4. With this suspension arrangement, the long overhead frame section 6 of the motor grader is not subjected to the load strains and heavy stresses to which this frame section 6 was formerly subjected when the bowl suspension units were connected with the overhead frame as in the Elenburg patent hereinbefore noted.

Referring now to the forward universal bowl suspension means 17 best illustrated in FIGS. 4 and 5, this construction comprises spaced brackets 19 and 20 secured to tube 15 centrally thereof and each bracket carries upper and lower link sets 21 and 22 pivoted at 23 and 24 on the brackets and on outer pivots 25 and 26 on spaced vertical links 27 and 28. A mounting block 29 is apertured to ride on the pivots 25 and 26 between links 27 and 28 to carry the stem 30 and fastening means 31 of a draft ball 32 that is universally mounted in a socket structure 33 firmly mounted on a wall portion of the motor grader frame 7.

An adjusting and locking means is provided in the suspension means 17 in the form of a hydraulic cylinder 34 with a ram 35 pivoted on pin 36 between links 21 and 21a while the cylinder pivots on pin 37 on the depending links 27 and 28 to thus lock the link structure in a given position to hold the bowl tube 15 in a given selected elevated position in relation to the axis of the draft ball 32 in socket 33. FIG. 5 shows the raised position of bowl tube 15 in full lines and a lowered position of the bowl tube 15 in the broken lines to indicate the vertical adjustment obtained through cylinder 34.

Referring now more specifically to the rear bowl suspension means 18 best illustrated in FIGS. 6 and 7, this general mechanism comprises a pair of side bracket plates 38 and 39 bolted to the opposite outer sides 40 and 41 of the grader frame 3 which brackets or plates include bearing members 42 and 43 to carry a cross shaft 44 to support a swingable bracket 45. Bracket 45 has a fore and aft pin 46 to rockably support a hanger 47 to carry the mechanisms that control the up and down positions as well as the tilted positions of the bowl 10 through tube 16, the hanger as described being capable of universal motion about pin 46 and its swingable supporting bracket 45 to easily accommodate all motions of the rear end of bowl 10 and its cross tube 15 under functional manipulation and under working conditions.

Outwardly spaced linkages 48 and 49 provide the bowl lifting means to each side of the central long axis of the motor grader for raising and lowering the bowl 10 by means of the rear transverse bowl tube 16. Linkage 48 comprises laterally rockable lifting arms 50 and 50a pivoted on spaced fore and aft plates 51 and 52 of the hanger 47 on a stub shaft 53, the outer ends of plates 50 and 50a being pin connected at 54 with a support or suspension rod 55. The lower end of rod 55 includes a universal connection 56 through cross shafts or pins 57 and 58, pin 58 being mounted in spaced brackets 59 and 60 that are secured to the cross tube 16 of bowl 10.

A power cylinder 61 is mounted on pin 62 centrally of the hanger plates 51 and 52 and ram 63 of the cylinder 61 joins the lifting arms 50 and 50a through pin 64 whereby the linkage 48 shown in FIG. 7 is operated to raise or lower tube 16 under control of the cylinder 61.

The linkage assembly 49 on the right side of FIG. 7 is the reverse duplication of the assembly 48 so that the same reference characters are primed and will be applied to identical elements.

In addition to the above described apparatus, the invention provides tilt control means in the form of a cylinder 65 with ram 66 pivotally carried on a pin 67 mounted on a bracket structure 68 secured to attachment plate 39, cylinder 65 having pivotal connection with a pin 69 that is supported by plates 51 and 52 of hanger 47.

Operation of cylinder 65 will swing the hanger assembly 47 transversely of the motor grader and at the same time the suspension linkages will cause tube 16 to tilt to incline the bowl 10 in either a left or right slope as viewed in FIG. 7. One position of tilt is shown in broken lines in FIG. 7 of the hanger and one tube position to illustrate the action.

A modified construction of a bowl control and variable support arrangement is illustrated in FIGS. 8, 9 and 10 to provide a different means to raise, lower or tilt a bowl such as 10 through connection with the rear transverse bowl tube or frame part 16.

In this construction, the near side assembly as shown in FIG. 9 provides spaced bracket plates 70 and 71 bolted to the opposite sides of the grader frame 3 and including a spacer structure such as 72 to keep the plates 70 and 71 in a given separated and aligned relation to accommodate the other suspension and bowl supporting working parts to be described.

A cylinder and lifting link mechanism is mounted upon the plates 70 and 71 for connection with a structural part of the bowl tube 16. This mechanism comprises cylinder 73 carried on a pin 74 on the plates 70 and 71 with the cylinder ram 75 joined on a pin 76 comprising a part of a self-aligning bearing 77 connected with spaced lifting arms 78 and 79. The latter arms 78 and 79 are mounted to rock on plates 70 and 71 through a self-aligning bearing 80 and the other free ends of plates or arms 78 and 79 join with a connecting link 81 through a self-aligning bearing 82, the latter link 81 being connected with another self-aligning bearing structure 83 carried by arms 84 and 85 secured rigidly to the T-brace member 86 mounted upon the tube 16 of the rear end of bowl 10, arms 84 and 85 being also mounted on the tube 16 as best shown in FIG. 9.

Connecting link 81 and the use of the self-aligning bearings such as 77, 80, 82 and 83 permit the bowl suspension structure to accommodate to front to back bowl adjustment and also to limited side motion of the bowl during the raising, lowering and tilting operations permitted by this described assembly. Since the same arrangement that has been shown in FIG. 9 and described appears in duplicate on the other side of the motor grader frame, similar parts or elements will be identified by the same reference numerals which are primed at the right in FIG. 8 where the duplicate mechanism appears.

With the construction in FIGS. 8, 9 and 10, level raising or lowering of the adjacent bowl end by means of the tube 16, which provides a structural part of the bowl 10, is accomplished by activating the cylinder 73 in FIG. 9 simultaneously with the corresponding cylinder on the other side of frame 3 causing the dual linkage mechanisms 86 and 87, in FIG. 8, to raise or lower the tube 16 in level relation to the frame 3 and in respect to the general plane of the surface being worked.

To induce tilt of the bowl 10 through the tube 16 structure, the mechanisms 86 and 87 are activated to cause the tube to raise with one of such mechanisms and to lower the tube with the other corresponding mechanism, the selection of which side to raise and which side to lower being determined by which angle of bowl inclination is needed to meet conditions of operation.

To enhance alignment and bowl positioning by means 86 and 87 and to counteract undue side sway stresses and to cause bowl working alignment to track with the vehicle carrying the bowl, a stabilizing mechanism 88 is employed as best shown in FIGS. 8 and 9.

This mechanism 88 comprises the use of a long transverse stabilizing bar 89 best shown in FIG. 8 which is swingably supported on a bearing shaft 90 carried upon a bracket assembly 91 fixed to plate 70′ of the left mechanism assembly shown at 87 which is at the far side of frame 3 in relation to the FIG. 9 illustration. The outer free end of bar 89 is pivotally carried on a bearing pin 92 mounted at the top end of an upright bracket 93 fixedly secured upon the T-brace member 86 forming a rigid part of the bowl tube 16 along the upper surface of the tube.

During the raising or lowering of the bowl 10 through the integral tube 16 structure, whether both units 86 or 87 work in unison upwardly, downwardly or in tilting function by opposite operation, the stabilizing bar and associated mechanism guides the rear bowl end substantially vertically while under the control and movement of the units 86 and 87. The relatively long length of bar 89 provides a very flat arc vertically at its outer end and with bearing pin 92 on bracket 93 to induce only negligible side motion to the adjacent bowl and tube end. The bowl guidance is, however, well maintained by the described stabilization mechanism 88, letting the opposite outward bowl control mechanisms 86 and 87 regulate and adjust the rear bowl end while the forward bowl support means provides the universal support for the front end of the self-contained bowl assembly.

It should be observed that the modified arrangement uses power cylinder means placed fore and aft of the vehicle to minimize any free fore and aft motion or shifting of the suspended bowl, which when taken in combination with the stabilization mechanism provides effective and efficient bowl support with ideal suspension from a mobile road working vehicle. Fore and aft motion of the bowl is intended to mean bowl motion toward and away from the front attachment 33 on the forward frame 7.

In the arrangement in FIGS. 1, 3, 6 and 7 all bowl control cylinders are transversely operable and the entire rear suspension is from point 46 and bracket 45 on shaft 44 to hold the bowl well in the line of travel and below the motor grader frame. In this case bowl tilt is activated by a cylinder crosswise of the vehicle and the stabilization apparatus is not here required. Maximum tilt to the right or left in FIG. 7 is limited by hanger contact with the underside of the vehicle frame 3 as shown in broken lines at the left at 94. While the tilt angle may be variously selected, it is in this case made to provide an inclination up to 15 degrees maximum in either direction of lateral tilt. The design in the modified form is also to allow 15 degrees tilt of the bowl in either direction transversely of the vehicle.

Since the forward bowl end is supported with the apparatus shown in FIGS. 4 and 5 including the ball and socket means 32 and 33, any raising or lowering of the remote rear end of the bowl will swing the rear tube 16 through an arc described from the center of the draft ball 32. Such action of the bowl is readily accommodated by the FIG. 7 assembly through bracket 45 on the cross shaft 44. In the FIG. 9 assembly such rear bowl motion is accommodated by the connecting links 81 and 81′.

It should also be mentioned that the stabilizing rod 89 connections such as at 90 and 92 include pivotal bar ball units as more clearly shown in the broken lines in FIG. 9 which enhance a certain amount of universal leeway for the functioning of rod 89 in performing the task for which the rod was devised.

The foregoing specification has been directed to certain preferred constructions to illustrate the present invention by way of example and not by way of limitation. Changes in the combinations shown or in the individual salient elements of the invention are contemplated without departure from the fundamental inventive concept. The extent of such modifications are not to be limited however except by the breadth and scope of the subject matter contained in the following claims directed to the earth working and material carrying scraper bowl construction of this invention as hereinbefore disclosed and described.

What I claim is:

1. A unitary scraper bowl assembly operatively suspended from the frame of a mobile vehicle, the vehicle frame comprising a rear portion, an intermediate portion including an upwardly inclined segment merging with the rear frame portion and an elongate forwardly extending segment, and a front portion merging with the elongated segment and having attachment means thereon, said bowl assembly comprising, in combination, a scraper bowl having structural members on the front and rear ends thereof, draft mechanism connected with said front structural member and connected with said attachment means including universal support means to permit universal movement of said bowl front end, rear bowl suspension mechanism comprising spaced apart support elements mounted on said rear frame portion, the location of said support elements and said attachment means defining a plane underlying said intermediate frame portion, said attachment means and said support elements constituting the sole supporting connections between said frame and said scraper bowl, universal bowl suspension apparatus carried by said support elements including laterally spaced operable link means connected with said rear structural bowl member at spaced locations thereon, power means on said suspension apparatus connected with said link means respectively to raise and lower said scraper bowl, and a bowl tilting means including a power device connected with one of the support elements and with said universal bowl suspension apparatus to bodily shift the latter relatively to the vehicle and to cause the power means and link means to tilt the rear structural bowl member and the rear bowl end under the control of said power device.

2. In the combination of claim 1, wherein the forward draft mechanism comprises a link structure interposed between the universal means and the forward structural member of the bowl with locking mechanism connected to support and to alter the positions of said link structure, including power means operable to change the relative elevations between the forward bowl end and said forward point of suspension on said vehicle through said link structure.

3. In the combination of claim 1, wherein said universal bowl suspension apparatus comprises a support bracket mounted upon a pivotal means supported by said attachable elements to swing in one direction and a rockable hanger suspended from pivotal means on said bracket to swing in another direction, the respective operable link means and power means therefor being connected to said hanger for connection with said rear structural bowl member.

4. In the combination of claim 3 wherein said link means include universal units to connect said link means with said rear structural member of said bowl.

5. In the combination in claim 3, wherein said power device of said bowl tilting means is interposed between one of said attachable elements and said rockable hanger.

6. A unitary scraper bowl assembly devised for bodily suspension and operative positioning from the frame of a mobile vehicle for earth working purposes comprising, in combination, a scraper bowl, draft means connected with the forward end portion of the bowl including universal pivotal means to permit bodily universal motion of said bowl forward end relative to the vehicle, link structure pivotally connected at both ends between the pivotal means and the forward bowl end portion operable to pivot said link structure for altering the vertical position of the forward bowl end portion relative to the pivot means, suspension mechanism connected with the rear end portion of the bowl comprising attachable mounting brackets for rigid connection with the frame of said vehicle, pivotal means carried by said mounting brackets to permit universal motion of said bowl rear end; dual supporting link means carried by said brackets and having connection with said bowl at spaced locations including power units having one end attached to said brackets and the other end attached to said link means respectively to raise and lower said bowl relatively to said vehicle frame and in relation to the surface being worked through the manipulation of said dual supporting link means.

7. In the combination of claim 6, wherein said dual supporting link means each comprises a first link mounted on its respective bracket for swinging motion toward and away from said bowl and a second link connected with said first link and said bowl to accommodate relative fore and aft motion between said first link and said bowl under conditions of operation.

8. In the combination of claim 6, with the provision of stabilizing means for operative connection between one of said brackets and said bowl to counteract side sway of said bowl during its suspension and manipulation by the dual supporting link means.

9. In the combination of claim 8, wherein said stabilizing means comprises a swingable bar having one end thereof pivotally connected with said one bracket and the other end thereof pivotally connected with a bowl part.

10. In the combination of claim 9, wherein said dual supporting link means are mounted upon said brackets for operation toward and away from the rear end of the bowl and in spaced planes situated in fore and aft directions to said bowl and said stabilizing means is disposed for operation in a plane disposed generally transversely of said bowl and to the fore and aft position thereof.

References Cited

UNITED STATES PATENTS

| 1,200,173 | 10/1916 | Denoyan | 37—126 |
| 2,518,105 | 8/1950 | Werth | 37—126 |
| 2,587,869 | 3/1952 | Marshall | 37—124 |
| 2,593,679 | 4/1952 | Kaupke | 37—126 XR |
| 3,052,049 | 9/1962 | Elenburg | 37—124 |
| 3,138,883 | 6/1964 | Elenburg | 37—124 |
| 3,149,429 | 9/1964 | Martin | 37—124 |
| 3,195,248 | 7/1965 | Martin | 37—124 |
| 3,302,316 | 2/1967 | Martin | 37—124 |

EDGAR S. BURR, *Primary Examiner.*

UNITED STATES PATENT OFFICE
CERTIFICATE OF CORRECTION

Patent No. 3,435,547                      April 1, 1969

William E. Martin

It is certified that error appears in the above identified patent and that said Letters Patent are hereby corrected as shown below:

Column 7, line 45, after "portion" insert -- , and power means --.

Signed and sealed this 31st day of March 1970.

(SEAL)
Attest:

Edward M. Fletcher, Jr.
Attesting Officer

WILLIAM E. SCHUYLER, JI
Commissioner of Patent: